United States Patent [19]
Johnston et al.

[11] Patent Number: 5,552,046
[45] Date of Patent: Sep. 3, 1996

[54] MULTI-STAGE MICROBIOLOGICAL WATER FILTER

[76] Inventors: Arthur W. Johnston; Arthur F. Johnston, both of 307 Bainbridge Dr., Atlanta, Ga. 30327

[21] Appl. No.: 376,424

[22] Filed: Jan. 23, 1995

[51] Int. Cl.$^6$ ................................................. B01D 27/02
[52] U.S. Cl. .......................... 210/266; 210/282; 210/489
[58] Field of Search ............................. 210/266, 314, 210/317, 335, 488, 489, 282, 500.23, 500.36

[56] References Cited

U.S. PATENT DOCUMENTS

| | | | |
|---|---|---|---|
| 4,636,307 | 1/1987 | Inoue et al. | 210/266 |
| 4,717,476 | 1/1988 | Scott | 210/266 |
| 4,800,018 | 1/1989 | Moser | 210/266 |
| 4,826,594 | 5/1989 | Sedman | 210/266 |
| 4,913,808 | 4/1990 | Haque | 210/266 |
| 5,019,252 | 5/1991 | Kamei et al. | 210/266 |
| 5,045,195 | 9/1991 | Spangrud et al. | 210/266 |

FOREIGN PATENT DOCUMENTS

| | | | |
|---|---|---|---|
| 1022394 | 1/1989 | Japan | 210/266 |
| 1022393 | 1/1989 | Japan | 210/266 |

*Primary Examiner*—Joseph W. Drodge
*Attorney, Agent, or Firm*—Thomas C. Saitta

[57] ABSTRACT

A multiple stage filter having an extended useful life comprising a first stage having granulated activated carbon enclosed by multiple filter wafers, the filter wafer comprising a number of filter media having pore size ranging from 0.45 microns to 5 microns, and a second stage comprising a filter membrane having pore size of 0.2 microns or less and a surface area of several square feet, such that greater than 99 percent of particulates greater than 0.5 microns are removed in the first stage and greater than 99.9 percent of the bacteria and cysts are removed in the second stage.

18 Claims, 2 Drawing Sheets

MULTI-STAGE MICROBIOLOGICAL WATER FILTER

BACKGROUND OF THE INVENTION

This invention relates generally to the field of water purification filters, and more particularly to the field of multiple stage filters having multiple filtering media. Even more particularly, the invention relates to such filters capable of removing microbiological particles and contaminants such as bacteria, cysts and viruses, where the filter is constructed to provide an extremely long useful life before replacement is required.

Drinking water which passes the minimal acceptability standards for contaminants still contains large amounts of impurities and contaminants. These contaminants may include natural and synthetic organics, microorganisms, such as bacteria, viruses, cysts, algae and fungi, suspended inorganic particulates and chemicals. These contaminants negatively alter the taste and odor of water. In instances where filters are employed to remove some of these contaminants, the filter itself can become a breeding ground for the microorganisms. Additionally, as filter media having very small pore size are incorporated to trap contaminants of very small diameter, the problem of pore clogging after extended use increases greatly.

It is known to utilize granulated activated carbon containing silver, multiple stages and membrane type filters to address the problems set forth above. The granulated activated carbon acts to adsorb a majority of the organic and inorganic contaminants, and the silver prevents the growth of bacteria trapped within the filter media. Multiple stage filters allow different filter media to be incorporated into a single filtering device. The different media may filter different types of contaminants using different entrapment mechanisms or they may vary in pore size. Membranes of very small pore size in the submicron range are known, but in current systems utilizing these membranes they tend to clog relatively quickly, leading to loss of water flow and pressure.

Obviously, the less often a filter needs to be replaced due to organic growth or restricted water flow, the more convenient it is to use. In commercial settings, such as for example individual vending machines located at numerous sites, it is very costly to replace the filters since a service technician must service each unit individually. Regulations for commercial vending machines in some instances require as much as a 5 log (99.999%) reduction in the bacteria *Streptococcus Faecalis* with a flow rate not less than 2 liters per minute at a pressure not to exceed 28 psi. A typical vending machine remains in service for three years before requiring an overhaul, and filters currently meeting the above standards must be replaced many times during the three years due to clogging.

It is an object of this invention to provide a water purification filter which is capable of removing organic and inorganic contaminants of extremely small diameter, down to the submicron range. It is a further object to provide such a filter which overcomes the clogging problem associated with conventional filters such that it has a greatly extended useful life of up to 3 years or the capability of filtering over 30,000 liters without a large reduction in the flow rate. It is a still further object to provide such a filter which is capable of removing viruses in the submicron range as well as over 99.9999 percent of bacteria present in water.

SUMMARY OF THE INVENTION

The invention is a multiple stage water purification filter having differing types of filter media which is capable of removing bacteria, cysts, viruses and many other contaminants found in drinking water in dimensions down to the submicron range. The filter comprises two main stages, the first stage comprising a number of filters and a bed of granulated activated carbon and removing over 99 percent of the particulates greater than 0.5 microns in size, removing chlorine, adsorbing volatile organics, trihalomethanes and many of the bacteria, viruses and inorganic elements found in water, and preventing growth of the bacteria trapped within the filter media. The second stage comprises a filter membrane having submicron pore size sufficient to remove remaining bacteria and cysts, the pore size being less than 0.5 microns, and extensive surface area of several square feet or more to insure that sufficient flow rate is maintained. Additional membranes of successively smaller pore size may be incorporated in the second stage to further increase the effectiveness of the filter against viruses.

The filter may be constructed within an integral housing, or it can be constructed as a replaceable cartridge adapted to be placed in a separate housing. Water ingress means and water egress means provide flow into the first stage of the filter and out of the second stage of the filter, respectively. The first stage is preferably comprised of a bed of granulated activated carbon containing an amount of silver ions, the granulated activated carbon being situated between two permeable multi-layer wafers. The wafers are preferably comprised of a number of layers of filter media having different pore size. The first wafer preferably comprises in order a relatively rigid, porous plastic first retention filter with relatively large pore size, for example from 45 to 90 microns, a number of felt filters with pore sizes from 5 to 0.45 microns, and a second retention filter similar in composition to the first retention filter. The second wafer is identical or substantially similar in composition to the first wafer. The second stage comprises a large surface area filter membrane with submicron pore size capable of blocking bacteria and cysts, preferably a thin membrane having several square feet of surface area and pore size in the range of 0.2 microns. The membrane is folded or pleated such that it occupies a very small total volume in relation to its surface area. To further enhance the effectiveness of the filter, one or more additional membranes with even smaller pore size, such as 0.03 or 0.01 microns for example, may be positioned downstream of the first 0.2 micron membrane, either at a separate location in the housing or preferably folded along with the first membrane prior to insertion into the device.

Because over 99 percent of the particulates having a size greater than 0.5 microns are removed in the first stage of the device, only a relatively small percentage of particles capable of clogging the small pore size filter membrane reach the second stage. This factor, coupled with the extremely large surface area of the filter membrane or membranes in the second stage, increases the useful life of the filter dramatically.

DETAILED DESCRIPTION OF THE INVENTION

With reference to the drawings, the invention will now be described in detail with the best mode and preferred embodiment being given. In general the invention is a multiple stage filter comprising a plural number of differing filter media, the filter media having varying pore size and being generally positioned such that the pore size of the filter media decreases relative to the flow direction of the water being purified. The filter comprises generally a first stage 10 and a second stage 20 within a housing 70, the first stage 10 acting to remove greater than 99 percent of all particulates of dimensional size equal or greater than 0.5 microns, as well as removing chlorine, adsorbing onto granulated activated carbon volatile organics, trihalomethanes and many of the bacteria, viruses and inorganic elements and inhibiting growth of microorganisms trapped within the filter media. The second stage 20 generally comprises one or more membranes 21 of very small pore size and large surface area.

Figure 1:
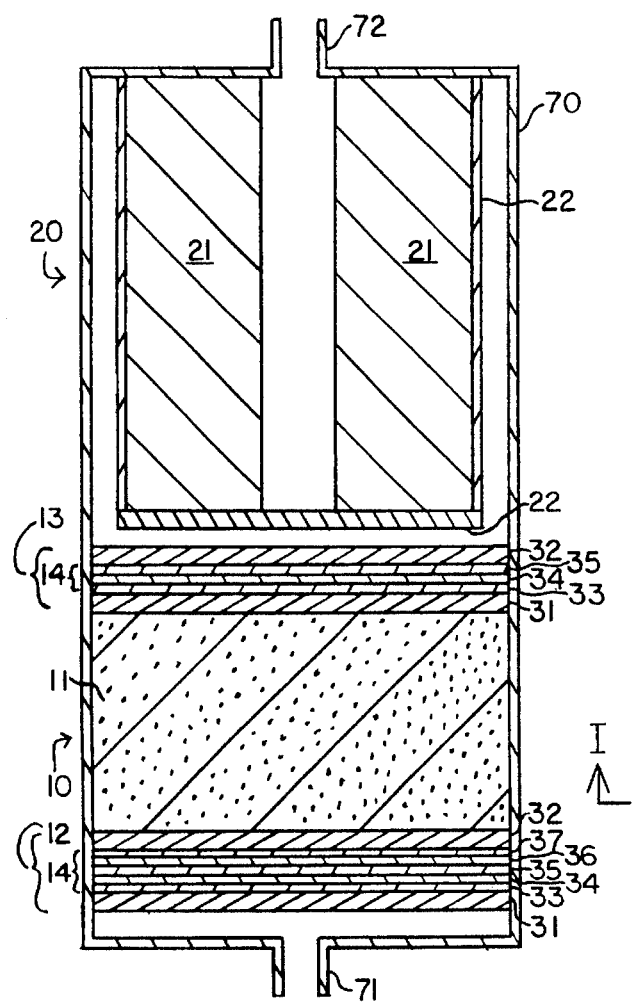
FIG. 1 is a cross-sectional view of the invention, taken along line I—I of FIG. 3.
Figure 3:
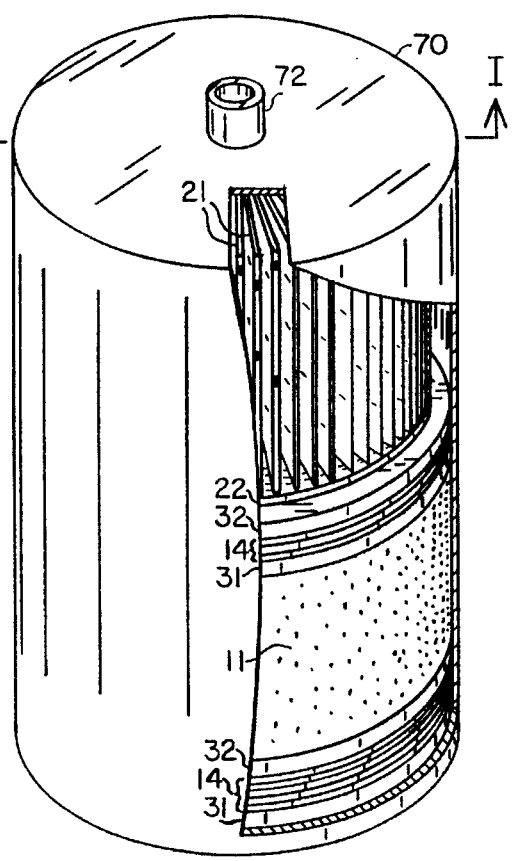
FIG. 3 is a perspective exposed view of the invention, with the folded filter membrane shown simplified and expanded for clarity.
Figure 2:
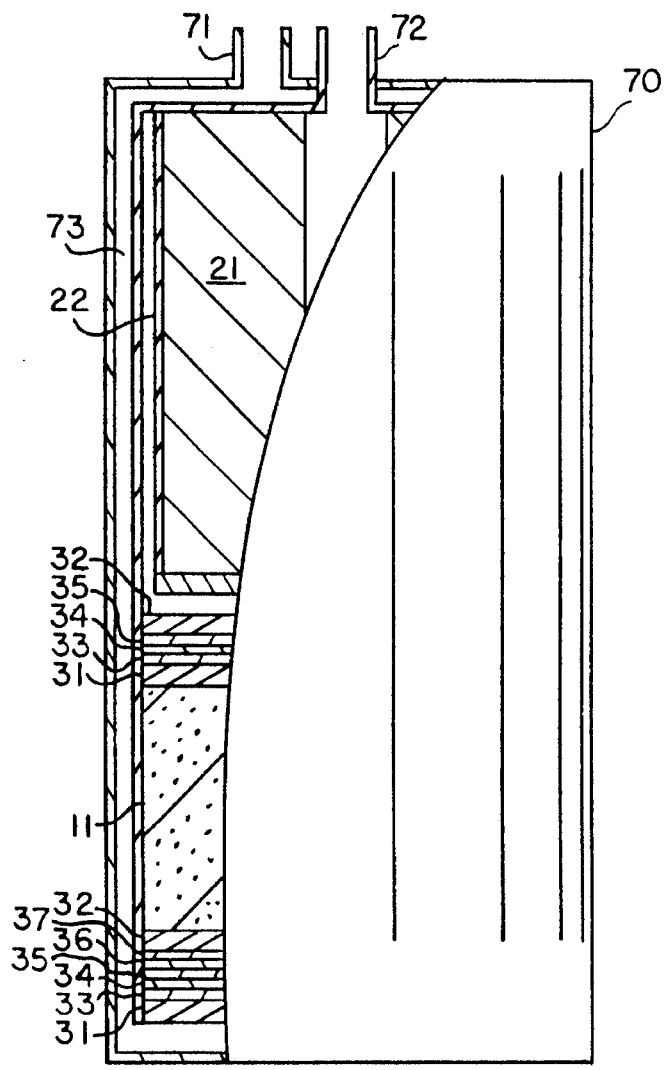
FIG. 2 is an exposed, partial cross-sectional view of the invention illustrating an alternative housing configuration.

Referring now to FIGS. 1 and 3, the invention is shown in a configuration where housing 70 has a water ingress means 71 and a water egress means 72 located at opposing ends of the filter. In this construction, the housing 70, typically constructed of hard plastic or the like, could be an integral part of the filter or it could form a cartridge for insertion into another external chamber. An alternative construction for housing 70 is shown in FIG. 2. The water ingress means 71, comprising any known type conduit, fitting, opening, etc., brings water into the first stage 10 of the filter for purification. The first stage 10 comprises three main components, a large bed of granulated activated carbon 11 contained between a first filter wafer 12 and a second filter wafer 13. The wafers 12 and 13 act to retain the granulated activated carbon 11, and are permeable to allow water to flow through the first wafer 12, into the granulated activated carbon 11 and out through the second wafer 13. The water flows from the first stage 10 into the second stage 20, where it passes through the filter membrane 21 and exits the device through water egress means 72. FIG. 2 illustrates an alternative flow path inside housing 70, such that both water ingress means 71 and water egress means 72 are located on the same end of the filter. Here an external channel 73 within the housing 70 allows the water to flow down to the bottom of the device to pass into first stage 10. Other configurations for the water flow path are also suitable.

The first filter wafer 12 of first stage 10 preferably comprises a number of layers of suitable filter media having varying pore sizes. The first wafer 12 should have sufficient strength and rigidity to retain the granulated activated carbon 11 in position under flow conditions, although this could also be accomplished by separate barrier components in addition to the actual filter media. Preferably, first filter wafer 12 comprises a sandwich of a plural number of felt type wafers between more structurally rigid outer members. As shown in FIGS. 1 and 2, the first filter wafer preferably comprises a first outer retention filter 31 and a second outer retention filter 32, first and second indicating positioning relative to the flow direction, each having relatively high flow and good dispersion characteristics, such that water flow is not concentrated in any one area of the filter, with relatively large pore size in the range of 45 to 90 microns. Outer filters 31 and 32 are preferably composed of a rigid, porous plastic material, such as polyethylene or the like, as available from Porex Technologies Corp., and should be in the range of ¼ to ⅛ inches thick for optimum dispersion. Unfocused dispersion from second outer filter 32 is especially important to prevent channeling of the granulated activated carbon bed 11. In between the first outer filter 31 and the second outer filter 32 are a number of interior filters 14 having pore sizes smaller than the pore size of the retention filters 31 and 32. Preferably, the interior filters 14 comprise a first filter 33 with pore size of 5 microns, a second filter 34 with pore size of 1 micron, and a third filter 35, fourth filter 36 and fifth filter 37 with pore sizes of 0.45 microns, although other combinations or pore sizes can be utilized within the ranges specified. These interior filters 14 may be composed of felt material, such as are available from American Felt and Filter. The first wafer 12 entraps a good portion of the large scale particulates of size greater than 5 microns, but the construction of the filter media does allow a significant portion to pass into the granulated activated carbon bed 11.

The granulated activated carbon 11 is preferably of small mesh size and may be of any known type suitable for this application, and preferably incorporates a percentage of silver ions or the like to inhibit bacteria growth. For example, a suitable granulated activated carbon 11 is an Ionics brand Hygene Mark I 20×50 mesh size with 1.05% silver. The water flows from the second retention filter 32 of the first stage 10 into the granulated activated carbon 11 in a widely dispersed manner. The granulated activated carbon 11 filters by adsorption, entrapping a number of inorganic and organic contaminants, removing chlorine and inhibiting growth of microorganisms because of the silver ions, all in the known manner. The water then passes into the second filter wafer 13, which like first filter wafer 12 is preferably comprised of a plurality of filter media. Preferably, second filter wafer 13 comprises a first retention filter 31 and a second retention filter 32, similar or identical to those components of first filter wafer 12, these also retaining a number of interior filters 14. As shown in FIGS. 1 and 2, the interior filters 14 within the second wafer 13 may number less than the number in the first wafer 12, and as shown consist of a first filter 33 with pore size of 5 microns, a second filter 34 with pore size of 1 micron, and third filter 35 and fourth filter 36 with pore size of 0.45 microns.

Water flows from the second retention filter 32 of second filter wafer 13 into the second stage 20 of the device. The first stage 10 has removed greater than 99 percent of the particulates having a dimensional size greater than 0.5 microns, meaning that only a very small percentage of the particulates of this size will reach the membrane filter 21 of the second stage 20. Membrane filter 21 has pore size of preferably 0.2 microns or less. Thus it is very important in terms of longevity that the majority of larger contaminants be removed from the water prior to it reaching the second stage 20, since relatively large scale contaminants ranging from 0.5 microns and larger, such as inorganics, pollen, large bacteria, fungi, etc., will rapidly clog membrane 21 because of its small pore size. This is the major failure of multiple stage filters currently in use having pore sizes of 0.2 microns or less.

The membrane 21 must have an extensive surface area in order to retain acceptable flow rates after extended usage, even with the vast majority of large scale particulates having been removed form the water in the first stage 10. The membrane 21 should have a surface area of at least several square feet. In order to fit within a relatively small area, the thickness of the membrane 21 must be minimal. Suitable plastic membranes 21 are available from many sources, such as for example a pleated nylon membrane having pore size of 0.2 microns housed in a cartridge and available from Micron Separation, Inc. Folding or pleating the membrane 21 allows it to be placed in an area of only a few square inches while still providing for many square feet of filtering surface area. The 0.2 micron pore size filters out almost all bacteria. As shown in the figures, the water preferably flows around the membrane 21 rather than being directed at any one point. Membrane 21 may be contained in a membrane cartridge 22 which has porous sides and a solid bottom to better direct the water flow into the membrane 21.

A filter as described above with a membrane 21 having seven square feet of surface area was tested for bacteria blockage, flow rate, pressure drop and capacity over time. Bacteria and cyst blockage, especially of *Klebsiella Terrigena, E-coli, Strep Faecalis, Giardia, Cryptosporidium* and *Microsporidium* are extremely important with regard to water purification, the suitability standards for purified water requiring blockage of greater than 99.9 percent of these entities. As previously stated, over 99 percent of the 0.5 micron or larger particulates were removed in the first stage 10. Thirty thousand liters of water were directed through the filter. After this amount of water had been purified, the filter continued to have a flow rate of greater than 2 liters per minute at 14 psi. Greater than 99.9999 percent of the bacteria and greater than 99.9 percent of the cysts were blocked by the filter.

Figure 4:
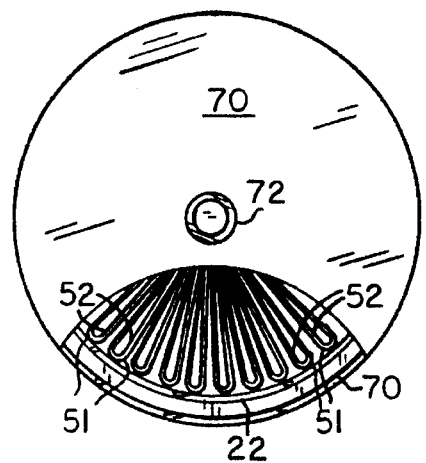
FIG. 4 is a partially exposed top view of the invention showing multiple filter membranes in the second stage, with the folded filter membranes shown simplified and expanded for clarity.

In an alternative embodiment to further enhance the effectiveness of the filter, the invention may further comprise additional membranes 21 in the second stage 20, the plural membranes 21 having differing pore sizes to filter even smaller particles from the water. A second membrane 52 may be positioned downstream of first membrane 51, preferably contiguous to the first membrane 51 by folding or pleating both membranes 51 and 52 together at the same time, as shown in FIG. 4, the second membrane 52 having pore size smaller than that of first membrane 51. For example, first membrane 51 may have pore size of 0.2 microns and second membrane 52 may have pore size of 0.03 or 0.01 microns. Furthermore, third or more membranes 21 could be added with successively smaller pore size. Because of the structure of the first stage 10, only a small percentage of particulates capable of clogging the first membrane 51, mostly bacteria and viruses, reach the second stage 20. Almost all of the remaining bacteria which could clog the second membrane 52 are stopped by the first membrane 51, allowing the second membrane 52 to filter out viruses without impeding water flow rates.

Flow rate and capacity of the filter product are a function of the first stage 10 permeable wafer 12 and 13 surface areas, the cubic volume of the granular activated carbon 11, and of the second stage 20 surface area of the membrane or membranes 21. Thus the invention can be adapted for use in a wide range of circumstances from point-of-use kitchen appliances to larger capacity and flow rate products such as point-of-entry products to provide better water.

It is understood that equivalents and substitutions may be obvious to those skilled in the art to the elements set forth above, and the above examples are by way of illustration only. The full scope and definition of the invention therefore is to be as set forth in the following claims.

We claim:

1. A multi-stage filter for purifying water comprising water inlet means, a first stage of filter media, a second stage of filter media and water outlet means, said water passing through said inlet means, said first stage, said second stage, and then through said outlet means, wherein said first stage of filter media comprises a bed of granulated activated carbon containing silver positioned between two multi-layer filter wafers, said first stage operable for removing greater than 99 percent of the particulates in the water having a dimension greater than 0.5 microns, and wherein said second stage comprises a large surface area filter membrane with a pore size less than 0.5 microns, said second stage operable for removing greater than 99 percent of all bacteria and cysts in the water.

2. The filter of claim 1, wherein said filter wafers comprise plural filters having a pore size between 5 and 0.45 microns.

3. The filter of claim 2, wherein said filter wafers each comprise a first filter having a pore size of 5 microns, a second filter having a pore size of 1 micron, and a third filter having a pore size of 0.45 microns.

4. The filter of claim 3, wherein each said filter wafer further comprises a pair of retention filters each having a pore size greater than 5 microns.

5. The filter of claim 4, wherein said retention filters have a pore size equal or greater than 25 microns.

6. The filter of claim 2, wherein said multi-layer filter wafers each comprise a first filter and a second filter, wherein the pore size of said second filter is smaller than the pore size of said first filter.

7. The filter of claim 6, wherein said multi-layer filter wafers further comprise a third filter, wherein the pore size of said third filter is smaller than the pore size of said second filter.

8. The filter of claim 1, wherein said filter membrane of said second stage has a pore size equal or less than 0.2 microns.

9. The filter of claim 8, wherein said filter membrane has a surface area of greater than two square feet.

10. The filter of claim 1, further comprising one or more additional large surface area filter membranes in said second stage, each said one or more additional filter membranes having a pore size equal or less than 0.03 microns.

11. A multi-stage filter for purifying water comprising water inlet means, a first stage of filter media, a second stage of filter media, and water outlet means, said water flowing through said inlet means, said first stage, said second stage and then through said outlet means, wherein said first stage of filter media comprises a bed of granulated activated carbon containing silver positioned between a first multi-layer filter wafer and a second multilayer filter wafer, said first wafer and said second wafer each comprising at least one filter having a pore size equal or less than 0.5 microns, and wherein said second stage comprises a filter membrane having a surface area of two feet or more and a pore size equal or less than 0.2 microns.

12. The filter of claim 11, wherein said first multi-layer filter wafer comprises a first filter having a pore size of 5 microns, a second filter having a pore size of 1 micron, and a third, a fourth and a fifth filter each having a pore size of 0.45 microns, and wherein said second multi-layer filter wafer comprises a first filter having a pore size of 5 microns, a second filter having a pore size of 1 micron and a third filter having a pore size of 0.45 microns.

13. The filter of claim 12, wherein said first multi-layer filter wafer and said second multi-layer filter wafer each further comprise a pair of retention filters having a pore size greater than 5 microns.

14. The filter of claim 13, wherein said first, second, third, fourth and fifth filters each comprise felt and said retention filters each comprise a rigid material.

15. The filter of claim 11, wherein said filter membrane of said second stage is folded.

16. The filter of claim 11, further comprising one or more additional filter membranes in said second stage, said one or more additional filter membranes having a pore size of equal or less than 0.03 microns.

17. The filter of claim 11, wherein said first multi-layer filter wafer and said second multi-layer filter wafer each comprise a first filter and a second filter, wherein the pore size of said second filter is smaller than the pore size of said first filter.

18. The filter of claim 17, wherein said first multi-layer filter wafer and said second multi-layer filter wafer each further comprise a third filter, wherein the pore size of said third filter is smaller than the pore size of said second filter.

* * * * *